(12) United States Patent
Gannon et al.

(10) Patent No.: US 11,389,757 B2
(45) Date of Patent: Jul. 19, 2022

(54) ADSORPTION/ABSORPTION FILTER MEDIA AND METHOD OF MAKING SAME

(71) Applicant: Solidification Products International, Inc., Northford, CT (US)

(72) Inventors: William J. Gannon, Northford, CT (US); David Tomlinson, Cheshire, CT (US)

(73) Assignee: Solidification Products International, Inc., Northford, CT (US)

( * ) Notice: Subject to any disclaimer, the term of this patent is extended or adjusted under 35 U.S.C. 154(b) by 220 days.

(21) Appl. No.: 16/732,963

(22) Filed: Jan. 2, 2020

(65) Prior Publication Data
US 2020/0206667 A1 Jul. 2, 2020

Related U.S. Application Data

(60) Provisional application No. 62/787,529, filed on Jan. 2, 2019.

(51) Int. Cl.
*B01D 39/00* (2006.01)
*B01D 39/20* (2006.01)
(Continued)

(52) U.S. Cl.
CPC ......... *B01D 39/2079* (2013.01); *B01D 35/04* (2013.01); *B01D 37/00* (2013.01);
(Continued)

(58) Field of Classification Search
CPC ....................... B01D 39/2079; B01D 39/2055; B01D 35/04; B01D 37/00; B01D 2257/556;
(Continued)

(56) References Cited

U.S. PATENT DOCUMENTS

| 6,485,639 B1 | 11/2002 | Gannon et al. |
| 6,841,077 B2 | 1/2005 | Gannon et al. |

(Continued)

FOREIGN PATENT DOCUMENTS

| CN | 103804553 B | 10/2015 |
| CN | 208250093 U | 12/2018 |

(Continued)

OTHER PUBLICATIONS (Huang, Y et al.) Reduced graphene oxide hybridized polymeric high internal phase emulsions for highly efficient removal of polycyclic aromatic hydrocarbons from water matrix, Langmuir, Mar. 4, 2018, pp. 8, 11, 22, vol. 34, No. 12.

(Continued)

*Primary Examiner* — Allison G Fitzsimmons
(74) *Attorney, Agent, or Firm* — DeLio Peterson & Curcio LLC; Robert Curcio

(57) ABSTRACT

A composite absorbent filter media having adsorption and/or absorption properties for the filtration of ester oils from a liquid includes a graphene and/or graphite composite mixed into a final emulsion, which is subsequently heat treated or cured, cooled, compressed, and dried. The resultant adsorption/absorption media is then disposed within a plug structure having an ingress and egress for liquids mixed with ester oils to pass through. Alternatively, the resultant adsorption/absorption media is disposed into a fabric and formed as a wall used to enclose oil-filled equipment. The media adsorbs/absorbs the ester oils from the liquid, while allowing the liquid to disperse and pass through.

37 Claims, 4 Drawing Sheets

(51) Int. Cl.
  *B01D 35/04* (2006.01)
  *B01D 37/00* (2006.01)
  *B01J 2/00* (2006.01)

(52) U.S. Cl.
  CPC ...... *B01D 39/2055* (2013.01); *B01D 2215/00* (2013.01); *B01D 2257/556* (2013.01)

(58) Field of Classification Search
  CPC ..... B01J 2/00; B01J 2/003; B01J 19/00; B01J 20/00; B01J 20/22; B01J 20/28; B01J 20/28014; B01J 20/28016; B01J 20/28019; B01J 20/2803; B01J 20/30; B01J 20/3028; B01J 20/3042; B01J 20/3085
  USPC ....... 977/734, 737, 742, 773, 775, 776, 778, 977/779
  See application file for complete search history.

(56) References Cited

U.S. PATENT DOCUMENTS

| | | | |
|---|---|---|---|
| 7,659,350 | B2 | 2/2010 | Prud'Homme et al. |
| 8,980,084 | B2 | 3/2015 | Dorsey |
| 9,646,735 | B2 | 5/2017 | Adamson et al. |
| 2011/0003239 | A1* | 1/2011 | Kadowaki ............. B82Y 30/00 252/511 |
| 2015/0348669 | A1* | 12/2015 | Adamson ............. B01J 20/261 252/511 |

FOREIGN PATENT DOCUMENTS

| | | |
|---|---|---|
| EP | 2395043 A1 | 12/2011 |
| WO | WO 01/74282 A1 | 10/2001 |

OTHER PUBLICATIONS (Che Man, SH et al.) Influence of Monomer Type on Miniemulsion Polymerization Systems Stabilized by Graphene Oxide as Sole Surfactant, Journal of Polymer Science, Oct. 8, 2013, pp. 5154-5162, Part A, vol. 51.

(Zheng, Z et al.) Macroporous Graphene Oxide-Polymer Composite Prepared through Pickering High Internal Phase Emulsions, ACS Applied Material Interfaces, Jul. 18, 2013, pp. 7974-7982, vol. 5.

(Zheming, G et al.) Emulsion Polymerization: A New Approach to Prepare Graphite Oxide Coated with Polyaniline, Journal of Macromolecular Science, Part B: Physics, 2009, pp. 226-237.

* cited by examiner

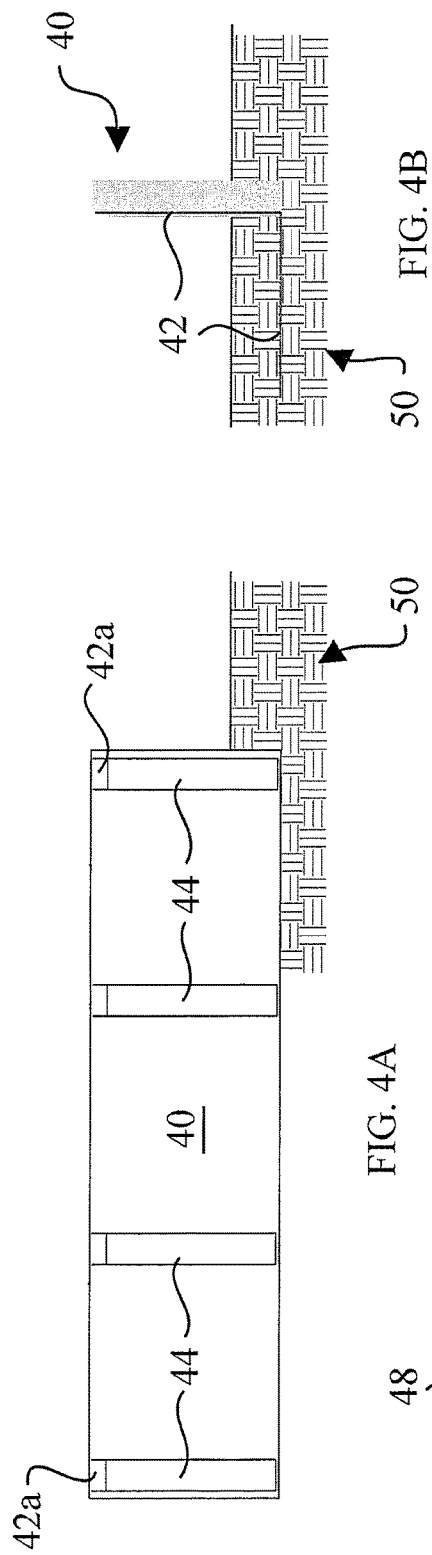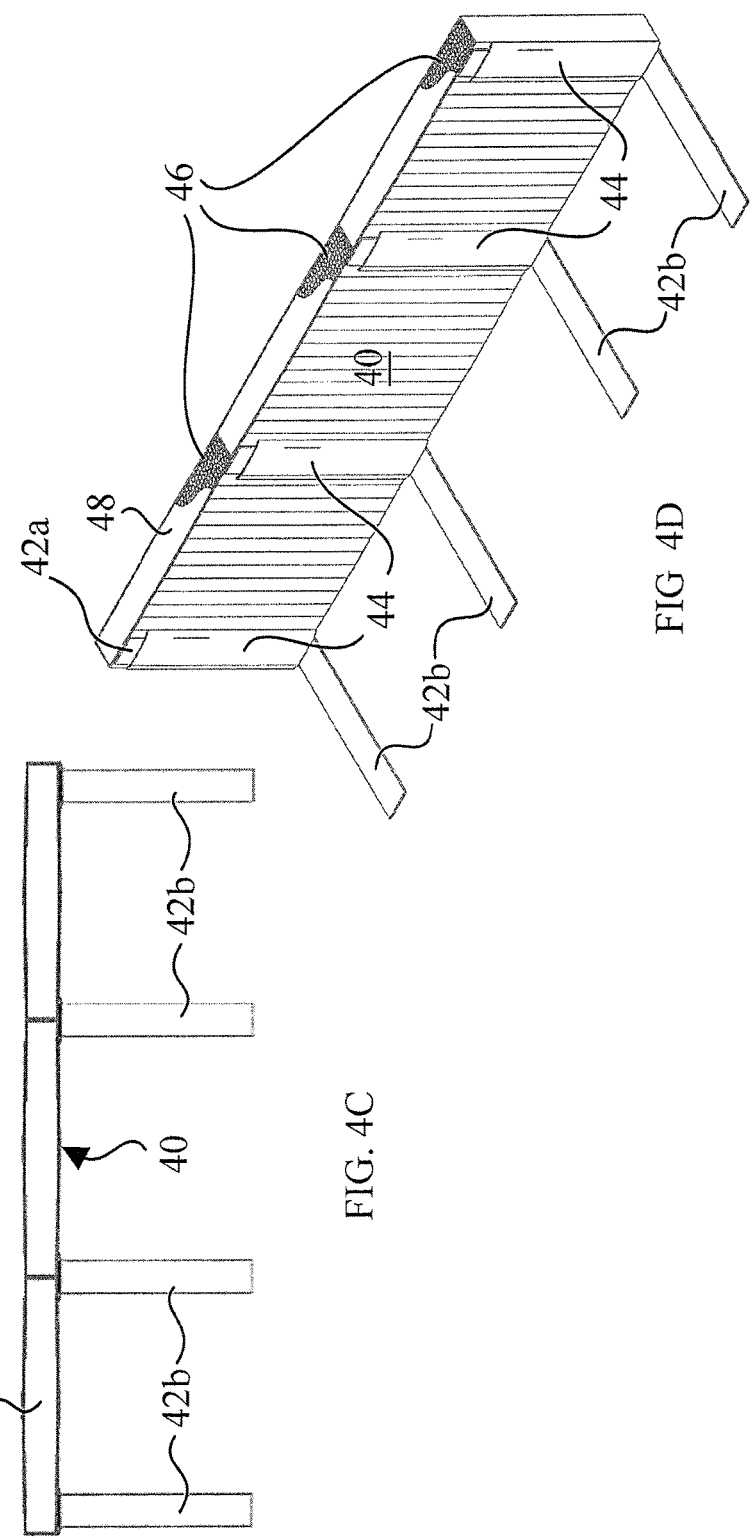

ADSORPTION/ABSORPTION FILTER MEDIA AND METHOD OF MAKING SAME

BACKGROUND OF THE INVENTION

1. Field of the Invention

The present invention relates to filtration media having adsorption and/or absorption properties for use in removing and/or solidifying synthetic ester-based fluids from liquids, such that the resultant liquids may be free from such oils and solvents after filtering. More particularly, the present invention relates to a composite absorbent filtration media containing graphene/graphite and the method of making and forming the same as a filtration media, for separating synthetic ester-based fluids from liquid, which is useful, for example, in power plant and other industrial applications.

2. Description of Related Art

Today's escalation in power demands pushes often aging networks to their limits, causing unprecedentedly high failure rates in their technologies, such as large power transformers. In these situations, mineral-oil-based dielectric insulating fluids have demonstrated costly limitations. For instance, mineral-oil-filled transformer explosions and fires causing heavy collateral damage have raised major safety concerns. There have also been major environmental concerns over the toxic effects of uncontained mineral oil spills. This has given rise to a new class of alternative dielectric insulating fluids (ester oils) that have historically been developed to answer these specific concerns, but present unique problems of their own.

In many commercial and industrial applications and installations, to prevent contamination of the environment by oils and solvents, spill containment systems are built that not only trap the potential spilled liquids but also any process liquid or rain/snow-melt liquid that comes in contact with the spill containment area. Federal, State and local regulations that mandate spill protection to minimize or eliminate contaminated discharges to the environment require engagement at the spill site, such as the implementation of containment methods and systems.

Present day power plants use natural and/or synthetic ester-based fluids (also referred to herein as "oils") to greatly improve electrical performance and cooling capabilities in their transformers. Ester based fluids may also be used as lubricants, and as hydraulic fluids. The use of natural ester oils at these plants present the possibility of oil spills occurring on-site, which presents a risk of environmental contamination. Natural esters may also be flammable or present poor biodegradable properties, among other issues. Synthetic ester-based fluids have thus been created in response to these issues that arise from the use of natural esters.

Synthetic base ester oil is oil that has been chemically synthesized. Typically, synthetic ester-based fluids are used in such applications as passenger car air-conditioning compressors, refrigerators, and transformers, and in other industrial applications. Synthetic esters are prized for their ability to lubricate at high temperatures. One of the main reasons for this is that they have a much lower volatility than other lubricant base oils at a given viscosity. Volatility is strongly related to smoke point, flash point, and fire point. Ester oils are generally utilized as a replacement for mineral oil in distribution and power class transformers.

Although these synthetic ester-based fluids are deemed to be non-hazardous and biodegradable, a formulation can include hundreds of additives, which address performance issues specific to their application and performance shortcomings of the base oil. Additives are commonly used to address oxidative aging, corrosion, high pressure, low or high temperature conditions, phase transition, shear, foaming, and hydrolysis (particularly for vegetable and synthetic ester-based oils). Consequently, the need exists for total synthetic ester-based fluid containment technology in the event that a failure occurs which requires immediate containment.

In U.S. Pat. No. 9,646,735 issued to Adamson, et al., on May 9, 2017, titled "GRAPHENE/GRAPHITE POLYMER COMPOSITE FOAM DERIVED FROM EMULSIONS STABILIZED BY GRAPHENE/GRAPHITE KINETIC TRAPPING," a graphene/graphite stabilized composite (e.g., graphene/graphite stabilized emulsion-templated foam composite) is used to make foam composites that have shown bulk conductivities up to about 2 S/m, as well as compressive moduli up to about 100 MPa and breaking strengths of over 1200 psi, with densities as low as about 0.25 g/cm$^3$.

Generally, graphene has been utilized as a filler for composite materials in part, because of its intrinsic mechanical, thermal, and electrical properties). For example, graphene's lack of solubility in substantially all solvents has led to the common practice of either using graphene oxide or reduced graphene oxide in the place of pristine graphene sheets.

The aforementioned graphene/graphite material may be formed as a media having adsorption and/or absorption properties to achieve desirable results when exposed to natural esters (e.g., hydrocarbon oils); however, reaction to synthetic ester-based fluids is entirely unique due to high flash point properties and resistance to combustion/explosion.

Thus, although the graphene/graphite polymer composite foam of U.S. Pat. No. 9,646,735 is promising for potential application to natural esters, there are limitations and unique challenges to the application of this composite for applications requiring the containment of esters (natural and synthetic).

SUMMARY OF THE INVENTION

Bearing in mind the problems and deficiencies of the prior art, it is therefore an object of the present invention to provide an absorption media that allows for a steady flow rate of water and sealing in the presence of an overloaded supply of ester-based fluids, and predominantly synthetic ester-based fluids.

It is another object of the present invention to provide a media having adsorption and/or absorption properties capable of adsorbing/absorbing both natural and synthetic ester-based fluids that simultaneously allows for water flow.

It is still a further object of the present invention to provide a method of making a media capable of adsorbing and/or absorbing both natural and synthetic ester-based fluids that simultaneously allows for water flow.

Yet another object of the present invention provides a plug structure for housing a media having adsorption and/or absorption properties in a way that allows for traversal of oil and liquid mixtures, resulting in the oil being adsorbed and/or absorbed by the media, and the liquid continuing to travel freely therethrough.

Still another object of the present invention provides a plug structure for housing a media having adsorption and/or absorption properties, the plug structure designed to be oriented in a manner that allows for optimal adsorption and/or absorption of oils and displacement of other fluids.

Still other objects and advantages of the invention will in part be obvious and will in part be apparent from the specification.

The above and other objects, which would not be apparent to those skilled in the art, are achieved in the present invention which is directed to a method of making an adsorption/absorption media. The method provides a graphene and/or graphite powder, and includes the steps of forming a final emulsion using said powder by combining said powder with a monomer, an initiator, and water, curing the final emulsion to form a resultant product, and drying said resultant product.

In an embodiment, the method may use graphene and/or graphite powder having a surface area between 300-500 $m^2$/g, MT % 90 (6 μm). The monomer may consist of aliphatic acrylates. Said aliphatic acrylates may be from the group consisting of: butyl acrylate, 2-ethylhexyl acrylate, dodecyl acrylate, ethyl acrylate, hexyl acrylate, isobutyl acrylate, isopropyl acrylate, nonyl acrylate, sec-butyl acrylate, and methyl acrylate. Said monomer may be from the group consisting of: butyl acrylate, divinyl benzene, methyl acrylate, tetra(ethylene glycol) diacrylate, and butyl methacrylate. The initiator may be an oil soluble azo initiator. Said oil soluble azo initiator may be from the group consisting of: AIBN (2,2'-azobis(2-methylpropionitrile)), 2,2-azobis(2,4-dimethyl valeronitrile), 2,2'-azobis(2-methylbutyronitrile), or dimethyl 2,2'-azobis(2-methylpropionate). The method may further include the step of adding an emulsifier during the step of forming the final emulsion. Said emulsifier may be a nonionic surfactant. The emulsifier may be a hydrophobic emulsifier with a hydrophile-lipophile balance value between 3-7. Said emulsifier may further be from the group consisting of: sorbitan monooleate, sorbitan stearate, sorbitan monopalmitate, and glyceryl monostearate.

In another aspect, the present invention may be directed to a method of making an adsorption/absorption media comprising the steps of: forming an organic phase mixture of said adsorption/absorption media, where said organic phase mixture includes: adding 4 to 5 Kg of butyl acrylate (>=99% purity) to a first vessel, adding 25 to 30 g of divinyl benzene Technical grade (80% purity) to said first vessel, and adding 9 to 15 g of 2,2' azobisisobutyronitrile to said first vessel; mixing the organic phase mixture until its color is approximately clear, forming an aqueous phase mixture of said adsorption/absorption media, where said aqueous phase mixture includes: adding 7 to 7.5 Kg of water to a second vessel, and adding 50 to 55 g of graphene or graphite powder to said second vessel; mixing said aqueous phase mixture, and combining the organic phase mixture with the aqueous phase mixture to form a final emulsion. The final emulsion is then mixed until its color is approximately uniformly black, then said final emulsion is poured into a container and cured at about 140 to 170° F. for about 8 to 15 hours to form a resultant product. Said final resultant product is then dried. A liquid extractor is applied to remove excess liquid from said resultant product, and the resultant product is ground into granules about 1 to 15 mm in diameter.

In an embodiment, the method may further include the step of mixing an emulsifier into the final emulsion prior to curing the final emulsion. The method may also include coating said granules with a wax. The method may still further include the step of mixing said granules with polymers, wherein said step of mixing said granules with polymers includes mixing a ratio of five parts granules to two parts polymers. The step of curing said final emulsion may occur at about 145° F. for about 12 hours.

In yet another aspect, the present invention is directed to a process for making an adsorption/absorption media. A graphene and/or graphite polymer composite is provided. The process includes the steps of: forming a final emulsion by mixing said graphene and/or graphite polymer composite with a predetermined amount of butyl acrylate, divinyl benzene, 2,2' azobisisobutyronitrile, and water; thermally initiating polymerization by curing said final emulsion at a temperature between 140-170° F. to form a resultant product, and then cooling said resultant product at approximately room temperature; subjecting said resultant product to compression and/or rolling and/or wringing to remove excess liquid; drying said resultant product; and grinding said resultant product into smaller portions or granules.

In an embodiment, the process may further include adding an emulsifier into the final emulsion prior to the step of thermally initiating polymerization. Said emulsifier may be from the group consisting of sorbitan monooleate, sorbitan stearate, sorbitan monopalmitate, and glyceryl monostearate. The final emulsion may be cured at about 140-170° F. for about 8-15 hours. Talc powder may be further added to said granulated resultant product. The step of thermally initiating polymerization by curing may include curing at approximately 60° C. for 8-16 hours. The process may further include the step of mixing said granulated resultant product with additional polymers. Said step of mixing said granulated resultant product with said additional polymers may include mixing at a ratio of five parts granulated resultant product to two parts additional polymers.

In still another aspect, the present invention is directed to an adsorption/absorption media plug structure for the filtration of oils from liquids, comprising a granulated adsorption/absorption media. The adsorption/absorption media comprises a graphene and/or graphite powder having a surface area between 300-500 $m^2$/g, MT % 90 (6 μm), a monomer comprising aliphatic acrylates, and an initiator comprising an oil soluble azo initiator. A plug structure having an ingress and an egress, and a plug housing, receives the granulated adsorption/absorption media therein.

In an embodiment, the plug structure housing may further include additional polymers mixed with said granulated adsorption/absorption media. The adsorption/absorption media and additional polymers within the housing may be mixed at a ratio of approximately five parts granulated adsorption/absorption media to two parts additional polymers. The media plug may further include a perforated plate disposed within the housing near the egress. Said aliphatic acrylates may be from the group consisting of: butyl acrylate, 2-ethylhexyl acrylate, dodecyl acrylate, ethyl acrylate, hexyl acrylate, isobutyl acrylate, isopropyl acrylate, nonyl acrylate, sec-butyl acrylate, and methyl acrylate. Said oil soluble azo initiator may be from the group consisting of: AIBN (2,2'-azobis(2-methylpropionitrile)), 2,2-azobis(2,4-dimethylvaleronitrile), 2,2'-azobis(2-methylbutyronitrile), or dimethyl 2,2'-azobis(2-methylpropionate). Said granulated adsorption/absorption media may further comprise an emulsifier, said emulsifier being from the group consisting of: sorbitan monooleate, sorbitan stearate, sorbitan monopalmitate, and glyceryl monostearate. Said plug structure may further be designed to allow for a vertically oriented installation. Alternatively, said plug structure may further be designed to allow for an angle oriented installation. Said angle oriented installation may be at an angle substantially between 15°-35° with respect to a planar floor.

In yet another aspect, the present invention is directed to an adsorption/absorption media wall structure for the filtration of oils from liquids, comprising a granulated adsorption/absorption media. The adsorption/absorption media comprises a graphene and/or graphite powder having a surface area between 300-500 m²/g, MT % 90 (6 μm), a monomer comprising aliphatic acrylates, and an initiator comprising an oil soluble azo initiator. A fabric encases said granulated adsorption/absorption media, formed as a wall. Said wall is partially buried below a ground or planar surface.

In an embodiment, the wall structure may further include pockets sewn into the fabric of the wall for receiving angled brackets therein. Said angled brackets may be formed in a substantially 90° angle, with a first part of the angled brackets being received by said pockets, and a second part of the angled brackets being buried below the ground or planar surface. Said aliphatic acrylates may be from the group consisting of: butyl acrylate, 2-ethylhexyl acrylate, dodecyl acrylate, ethyl acrylate, hexyl acrylate, isobutyl acrylate, isopropyl acrylate, nonyl acrylate, sec-butyl acrylate, and methyl acrylate. Said oil soluble azo initiator may be from the group consisting of: AIBN (2,2'-azobis(2-methylpropionitrile)), 2,2-azobis(2,4-dimethylvaleronitrile), 2,2'-azobis(2-methylbutyronitrile), or dimethyl 2,2'-azobis(2-methylpropionate). Said granulated adsorption/absorption media may further comprise an emulsifier, said emulsifier being from the group consisting of: sorbitan monooleate, sorbitan stearate, sorbitan monopalmitate, and glyceryl monostearate.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 4A is a front elevational view of a wall structure formed by a fabric and reinforced by angled support brackets, the fabric containing the composite absorbent filtration media of the present invention therein.

FIG. 4B is a side elevational view of the wall structure of FIG. 4A disposed partially below grade, and further showing a portion of the angled support brackets extending through the ground.

FIG. 4C is a top-down view of the wall structure of FIG. 4A.

FIG. 4D is a perspective view of the wall structure of FIG. 4A.

DESCRIPTION OF THE EMBODIMENT(S)

Figure 1:
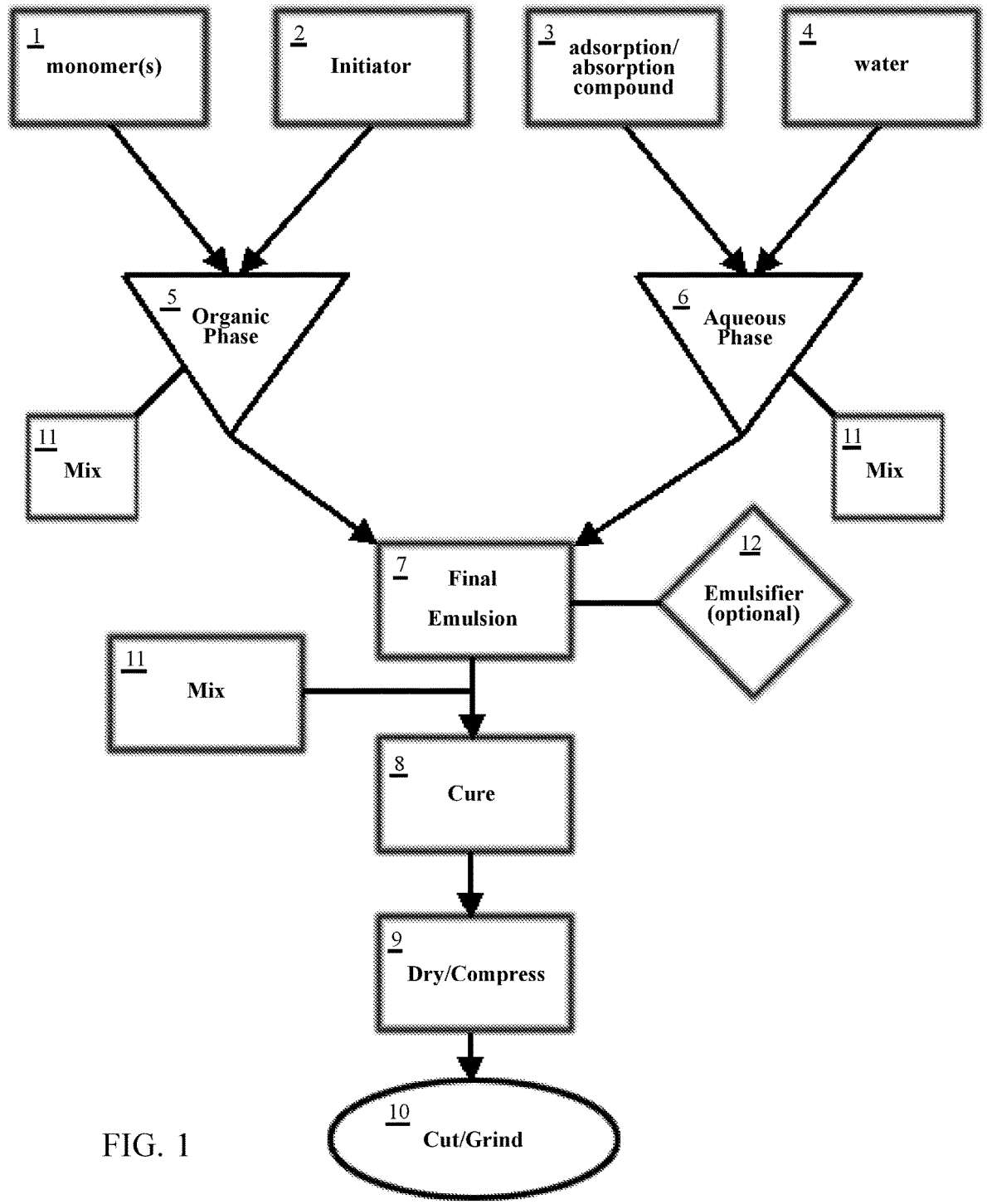
FIG. 1 is a flowchart demonstrating the general steps of forming the composite absorbent filtration media of the present invention.

In describing the embodiment(s) of the present invention, reference will be made herein to FIGS. 1-4D of the drawings in which like numerals refer to like features of the invention.

The media of the present invention presents a novel improvement over U.S. Pat. No. 6,841,077 titled "SEPARATION OF HYDROCARBONS FROM HYDROCARBON CONTAINING LIQUID" and filed on Oct. 30, 2002 (the "'077 Patent"); and U.S. Pat. No. 6,485,639 titled "SEPARATION OF HYDROCARBONS FROM HYDROCARBON CONTAINING LIQUID" and filed on Jan. 7, 1999 (the "'639 Patent"); both of which were invented by William Gannon, et al., and assigned to Solidification Products International, Inc. The disclosures of the above patents are incorporated by reference herein (collectively the "Incorporated Patents").

The embodiments of the present invention disclosed herein present an adsorption and/or absorption compound using a graphene/graphite powder. In an embodiment, the graphene/graphite powder is mixed into an emulsion using various amounts of Butyl Acrylate, (>=99% purity). Divinyl benzene Technical grade (80% purity), 2,2' Azobisisobutyronitrile (99% purity), sorbitan monooleate (a nonionic surfactant), and water.

In one embodiment, an initial mixture comprises combining an adsorption and/or absorption compound, such as graphene/graphite powder (e.g. a graphene/graphite polymer composite foam). The graphene/graphite powder may have a surface area between 300-500 m²/g, with a particle size distribution rate of MT % 90 for particles with a 6 μm average diameter (wherein at least 90% of the graphene/graphite powder particles have a surface area of less than 6 μm). This compound is mixed into a final emulsion using various, predetermined amounts of butyl acrylate (>=99% purity) (used in the copolymerization of styrene), divinyl benzene (DVB) (a bis unsaturated monomer, which along with styrene as a co-monomer is used in producing crosslinked polymers), for example. Divinyl benzene Technical grade (80% purity) manufactured by Sigma-Aldrich, 2,2' Azobisisobutyronitrile (99% purity) (an organic compound with the formula [(CH$_3$)$_2$C]$_2$N$_2$, often used as a foaming agent in plastics and rubber and as a radical initiator), an optional nonionic surfactant (such as sorbitan monooleate or sorbitan oleate) and which, for exemplary purposes, may be SPAN®80 produced by Sigma-Aldrich, Inc., of St. Louis, Mo., Mo. and water.

Various other chemical equivalents may be used to achieve the aforementioned initial mixture of the present invention.

A monomer mixed with the graphene/graphite powder may consist of aliphatic acrylates (alkyl acrylates) such as those including, consisting of, and/or deriving from, but not being limited to, butyl acrylate, 2-ethylhexyl acrylate, dodecyl acrylate, ethyl acrylate, hexyl acrylate, isobutyl acrylate, isopropyl acrylate, nonyl acrylate, sec-butyl acrylate, or methyl acrylate. Other monomers deriving from the group consisting of butyl acrylate, divinyl benzene, methyl acrylate, tetra(ethylene glycol) diacrylate, and butyl methacrylate may be used.

An initiator added in after the graphene/graphite powder and monomer are mixed may consist of oil soluble azo initiators deriving from the group consisting of, but not being limited to, AIBN (2,2'-azobis(2-methylpropionitrile), 2,2'-azobis(2,4-dimethylvaleronitrile), 2,2'-azobis(2-methylbutyronitrile), or Dimethyl 2,2'-azobis(2-methylpropionate).

An emulsifying agent (previously referred to as the optional nonionic surfactant) mixed in to stabilize the resultant mixture may consist of nonionic, hydrophobic emulsifiers with a hydrophile-lipophile balance ("HLB"; a measure of the degree to which it is hydrophilic or lipophilic) value between 3-7 (indicating hydrophobic to water dispersible), deriving from the group consisting of, but not being limited to, sorbitan monooleate, sorbitan stearate, sorbitan monopalmitate, or glyceryl monostearate.

For more thorough mixing, the final emulsion of the present invention may be further mixed using a variable speed electric mixer with a stainless-steel impeller. After all products are thoroughly mixed into the emulsion, they are then poured into chaffing trays, or other containers capable of withstanding extreme temperatures.

Once the final emulsion of the present invention is formed, the polymerization is thermally initiated. The final emulsion within the trays is put into a low temperature oven at a temperature of about 60° C. (approximately 140° F.) for approximately 8-16 hours, and preferably around 12 hours, to form a resultant product.

Afterwards, the trays containing the resultant product (formed now as a black solid) are removed from the oven and cooled to room temperature, upon which the resultant product is removed and subjected to a rolling/wringing process where the black solid is compressed and a significant portion of the remaining water (i.e. most of the remaining water) is removed. The resultant product is then dried and cured for an extended period of time.

This resultant solid graphene/graphite material is then cut into strips to allow for easier grinding. These strips of graphene/graphite material are grounded into small granular portions having diameters between 1-15 mm (preferably 3-10 mm). The granular portions are then mixed with additional polymers, such as those identified and presented in the Incorporated Patents. Ideal mixtures for achieving the adsorption and/or absorption material of the present invention comprise 5 parts granular portions and 2 parts of the aforementioned polymers.

The resultant graphene/graphite adsorption and/or absorption material presents adsorption/absorption capabilities when exposed to oil. The present invention is further enhanced with a proper mixture of a graphene material, polymer, and other additives to prevent compression issues caused by water flowing at high volumes. A faster water flow rate thus results. In an embodiment, two types of polymers are mixed at a rate of five parts graphene/graphite material to one part each of said two separate polymers. Adding these two polymers advantageously increases the flow rate of water through the final adsorption and/or absorption media, and also allows for a more cohesive solid with the synthetic ester based fluid.

After the resultant adsorption and/or absorption material is grinded (in bits of approximately 3 mm-27 mm in diameter) to create the adsorption/absorption media of the present invention, separation of those pieces is crucial in maintaining channels for water to drain through. Talc is introduced to the mixture at an amount approximately worth 0.3-2% by weight of the total composition to prevent such attachment or "growing together" of the polymer pieces. The talc is used in very small additions and coats the ground granular graphene material, which allows it to be compressed to a filter cake and provide channels for water to flow through.

The composite absorbent filtration media of the present invention may be achieved through a method of heating a final emulsion mixture for a set period of time at a preferred temperature. This emulsion is created in two phases: an organic phase 5 and an aqueous phase 6, as outlined in the flowchart of FIG. 1. Curing of this final emulsion will eventually create a resultant product to be ground into the composite adsorbent filtration media.

In creating the organic phase 5, a range of approximately 4-5 kg, and preferably 4.3 kg of butyl-acrylate (represented as at least one of the aforementioned monomer(s) 1) is added to a vessel.

After the proper amount of butyl-acrylate (monomer(s) 1) is measured out, divinyl benzene liquid (another of the at least one monomer(s) 1) in a range of approximately 25-30 g, and preferably about 27.5 g, such as SPAN®80 manufactured by Sigma-Aldrich, Inc., is added to the vessel containing the butyl-acrylate.

2,2'-Azobis(2-methyl-propionitrile) (an initiator 2) in a range of approximately 9-13 g, and preferably about 1 g, is added to the mixture of butyl-acrylate and divinyl benzene liquid (monomer(s) 1), which turns the mixture into a pinkish color tone upon its addition. The combined mixture of 2,2'-Azobis(2-methyl-propionitrile) (initiator 2), butyl-acrylate, and divinyl benzene liquid (monomer(s) 1) is mixed, preferably using the variable speed electric mixer and stainless-steel impeller (represented by mix 11).

Once the 2,2'-Azobis(2-methyl-propionitrile) (initiator 2) is dissolved from the mixing process 11, the finished solution should turn into a clearer color, which indicates the end of the organic phase. The final mixed solution of the organic phase 5 is set aside for later addition to a final emulsion 7.

In the aqueous phase 6, water 4 in a range of approximately 7.0-7.5 kg, and preferably about 7.2 kg is added to a separate vessel (e.g., a beaker to allow for easier pouring once the final emulsion 7 is ready for tray distribution).

Graphene powder (represented as adsorption/absorption compound 3 in FIG. 1) in a range of approximately 50-55 g, and preferably about 52.8 g, is separately weighed and then added to the vessel containing water 4. The graphene powder (compound 3) and water 4 mix is then stirred using an electric mixer and stainless-steel impeller (shown as mix 11) until all the graphene powder is fully mixed and evenly distributed. This completes the aqueous phase 6.

In another embodiment of the aqueous phase, up to 30 grams of additional graphene powder (compound 3) is added to the vessel. The additional graphene results in a higher finished graphene/graphite material yield and decreased amounts of waste water disposed on the trays after a curing process 8.

Once the aqueous phase 6 is complete, the vessel containing the finished organic phase 5 is poured into the vessel containing the finished aqueous phase to create the final emulsion 7. Upon such initial pour, these mixed phases 5, 6 will present a gray, cloudy appearance in the final emulsion 7. These combined phases are continually mixed using the electric mixer and stainless-steel impeller for approximately 15 minutes (mix 11), or until full mixture is visibly achieved, which is indicated by the emulsion 7 moving away from a gray, cloudy appearance to a uniformly black liquid.

Once the mixture of the organic 5 and aqueous 6 phases are satisfactory, an optional emulsifier 12 (e.g. sorbitan monooleate nonionic surfactant, or the like) may be added to the final emulsion 7 in order to achieve final emulsion stability.

After the optional emulsifier 12 is fully mixed into the final emulsion 7, the final emulsion product 7 is poured into chaffing trays (approximately 5-9 cups and preferably about 7 cups of emulsion per tray).

The trays are then covered and placed into an oven at a temperature range of approximately 140-170° F., and preferably about 145° F. for approximately 8-15 hours and preferably about 12 hours, to form a resultant graphene material (represented as cure step 8 in FIG. 1). After the emulsion-filled trays have cured for the appropriate amount of time and the resultant product has formed, the oven is turned off and the trays are left to air-dry (with the assistance of a blower in some instances; generally represented as dry/compress step 9).

After curing step 8, it is common for leftover wastewater (mixed with trace amounts of butyl-acrylate) to sit on the surface of, and be adsorbed into, the resultant product. This wastewater may be squeezed out of the resultant product by hand, or alternatively by a water extractor (dry/compress step 9). Once the wastewater is extracted from the resultant product, the resultant product may be placed back in the oven to speed up and complete the drying process (dry/compress 9).

This resultant dried, solid graphene/graphite resultant product may then be cut into strips to allow for easier grinding (represented as cut/grind step 10). These strips of resultant product are grounded (step 10) into granules having diameters between 1-30 mm (preferably 3-27 mm), and then optionally mixed with hydrocarbon absorbing polymers. As an example, a mixture for achieving the adsorption/absorption material of the present invention may comprise 5 parts crumbled resultant product and 2 parts of the aforementioned polymers.

After mixing the 5-parts granulated resultant product created in the embodiments of the present invention (and optionally 2 parts polymers), the completed media mixture is then compressed into a filter cake. These final adsorption/absorption media filter cakes of the present invention are then inserted into a housing of a tube container or plug structure to be introduced into a drainage pipe, as shown in FIGS. 2A-2C and 3A-3C. This tube container or plug structure containing the media of the present invention acts as a plug when an overload of synthetic ester-based fluids (typically mixed with other liquids such as water) is introduced to the tube. The oil and fluid mix will pass through an ingress of the tube container or plug structure, and is slowly absorbed into the media of the present invention, eventually forming a solid which stops all further flow from discharging. Once fully formed into a solid, all further absorption is prevented and excess oil is stopped from flowing through. Excess oil will instead build on top of the plug structure and back up into an oil containment basin. Non-oil based liquids such as water will continue to be dispersed and traverse through the tube container or plug structure, exiting through an egress, until the solid structure is formed. After enough oils are absorbed, all oils and liquids are prevented from flowing therethrough. After such "plugging" action occurs, the tube may be removed from the drainage pipe and disassembled. Upon disassembly, the unused granular mixture of the present invention falls out and eventually disposed of, while the oil-absorbed media stays within the tube in the form of a semi-solid cake, sealed to the sides of the tube due to its solidification.

The graphene material itself is not responsible for the formation of the semi-solid cake when the present invention is exposed to the overload of oil and water mix. Instead, the graphene material is responsible for adsorbing and/or absorbing the oil and displacing the water upon such exposure. When presented with an overload mix of oils and water, the top portion of the tubed graphene material absorbs the oil, and the bottom portion remains in granular form with the displaced water adsorbed. This granular portion can be squeezed to release the water. The swollen pieces of the graphene material cannot be squeezed to freely release the fluid after they are adsorbed in the top portion and swell. This absorption capability deters compressing forces from squeezing the oils out of the filter media and escaping into the environment.

The present invention thus utilizes the fluid absorption capabilities of the graphene material to further create a cake upon fluid absorption by incorporating the proper mixture of polymer and other materials. This final mixture of the present invention may be used for containment purposes, or for spill control of such synthetic ester-based fluids. It may further be used for any purpose of allowing water to drain from containment areas.

In another embodiment, the finished graphene material is coated with a wax prior to insertion into the tube container or plug structure. This wax coating improves the water adsorption, and synthetic ester absorption capabilities of the present invention. The addition of a waxy coating to the finished graphene material further helps in combating compression forces exerted onto the filter media from water buildup.

Figure 2A:
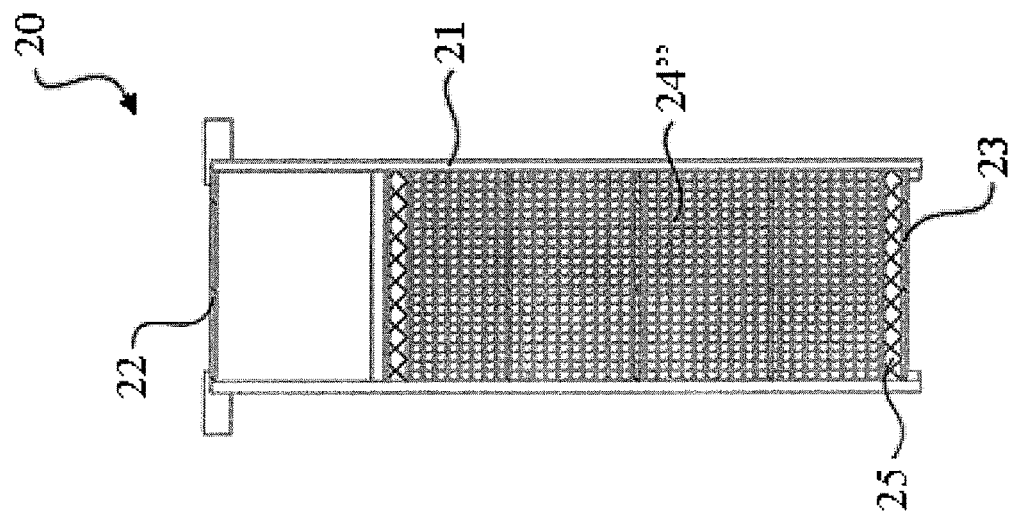
FIG. 2A is a side cross-sectional view of a vertically oriented plug structure containing larger sized particles of the composite absorbent filtration media of the present invention.
Figure 2B:
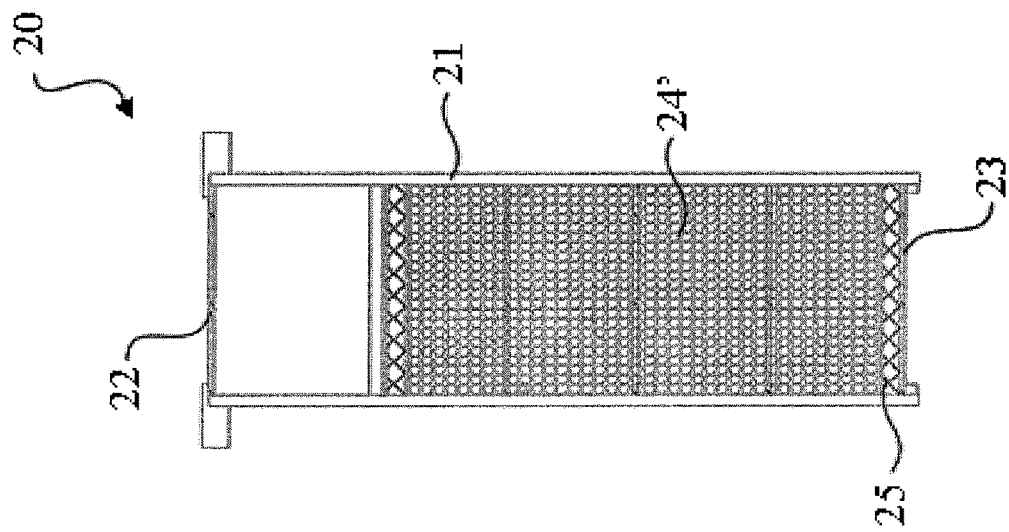
FIG. 2B is a side cross-sectional view of the plug structure of FIG. 2A containing smaller sized particles of the composite absorbent filtration media of the present invention.
Figure 2C:
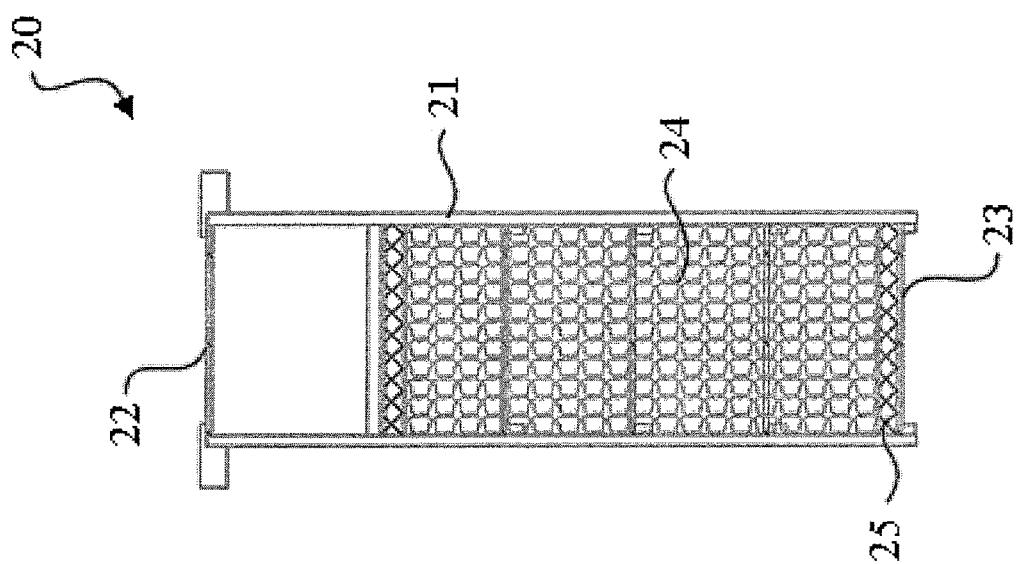
FIG. 2C is a side cross-sectional view of the plug structure of FIG. 2A containing a mixture of smaller sized particles of the composite absorbent filtration media of the present invention, and additional polymers mixed with said composite absorbent filtration media.

In an embodiment, the plug structure or tube container 20 that contains the absorption material 24, 24', 24" within its housing 21 is generally situated vertically as shown in FIGS. 2A-2C, so that gravity flow is maximized. This vertical plug structure has an ingress 22 located at its top surface, and an egress 23 located at its bottom surface. A perforated plate 25 may further be disposed at the bottom of the plug structure housing 21 near the egress 23. The plug structure 20 may include any variations of the composite absorbent media of the present invention as described herein, including purely the media granulated into larger particles 24 as shown in FIG. 2A, purely the media granulated into smaller particles 24' as in FIG. 2B, or a mixture of the composite absorbent media and additional polymers 24" as shown in FIG. 2C. The mixture 24" of FIG. 2C may employ the same mixture ratio of five parts composite absorbent media and two parts polymers, as described above.

Figures 3A, 3B, 3C:
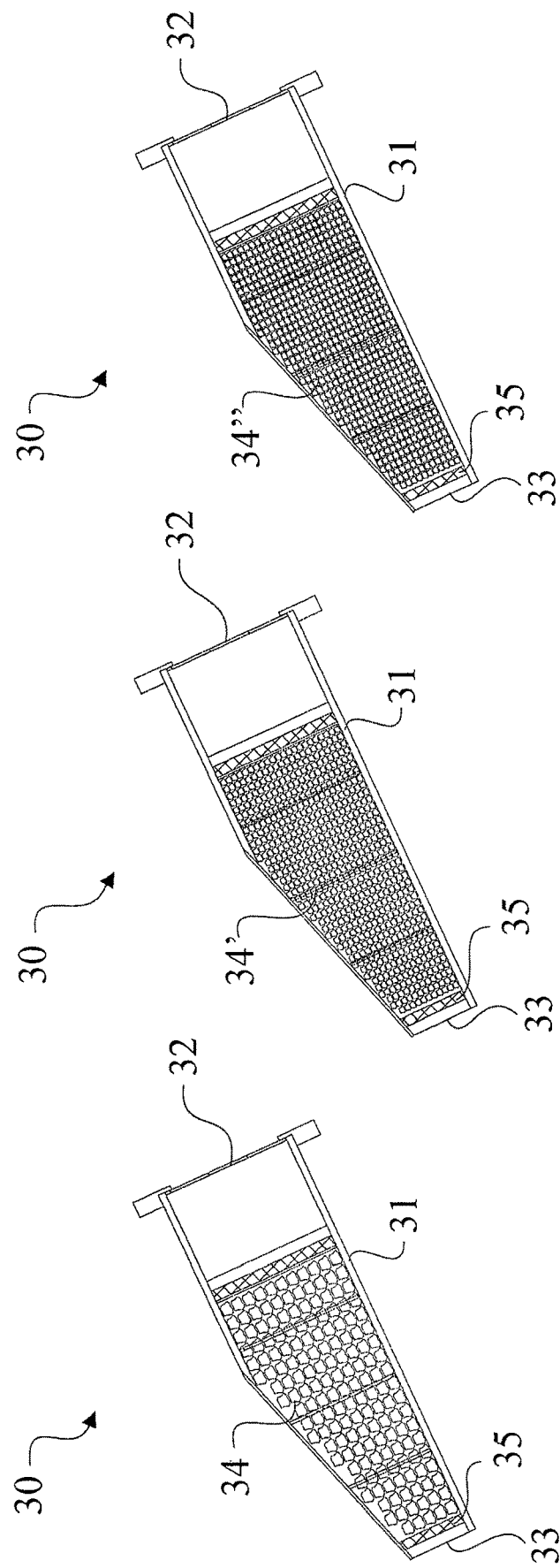
FIG. 3A is a side cross-sectional view of an angle oriented plug structure containing larger sized particles of the composite absorbent filtration media of the present invention.
FIG. 3B is a side cross-sectional view of the angle oriented plug structure containing smaller sized particles of the composite absorbent filtration media of the present invention.
FIG. 3C is a side cross-sectional view of the angle oriented plug structure containing a mixture of smaller sized particles of the composite absorbent filtration media of the present invention, and additional polymers mixed with said composite absorbent filtration media.

An alternative embodiment to a plug structure or tube container 30 involves installing the plug structure 30 at an angle (instead of in a vertical orientation), as shown in FIGS. 3A-3C. This design, also referred to herein as the "shark fin" design, also has an ingress 32 located at its uppermost edge, and an egress 33 located at its bottommost edge. A perforated plate 35 may further be disposed at the bottom of the plug structure housing 31 near the egress 33. The plug structure 30 may include any variations of the composite absorbent media of the present invention as described herein, including purely the media granulated into larger particles 34 as shown in FIG. 3A, purely the media granulated into smaller particles 34' as in FIG. 3B, or a mixture of the composite absorbent media and additional polymers 34" as shown in FIG. 3C. The mixture 34" of FIG. 3C may employ the same mixture ratio of five parts composite absorbent media and two parts polymers, as described above. The shark fin design is installed at an angle substantially between 15°-35° with respect to the planar floor. At this angle, water/oil flow rate decreases by about 10-15% as opposed to a vertically oriented plug, but the required amount of material needed for proper adsorption/absorption and drainage to occur is effectively reduced to ⅓ of that required in the same vertical plugs. This shark fin design is thus more cost-effective to manufacture, yet produces the same adsorption/absorption results as the vertical plugs.

In an alternative embodiment, an adsorption and/or absorption media 46 of the present invention is inserted between fabrics and formed as a wall 40 which may be used to enclose oil-filled equipment, as shown in FIGS. 4A-4D. Two flexible adsorbent/absorbent fabrics 48 encase the media 46 of the present invention to form said media filtration wall 40 by either sewing or heat-sealing the seams surrounding the fabric. Pockets 44 are further sewn into the fabrics 48 of wall 40 for receiving angled support brackets 42 therein. These brackets 42 are formed in a substantially 90° angle, with a first portion 42a of the bracket being received in the pockets 44 oriented parallel to the face of wall 40, and a second portion 42b of the bracket extending perpendicular to the face of wall 40. The assembled wall 40 may then be installed partially submerged beneath a ground or planar surface 50, with the second portion of angled brackets 42 extending through the earth and providing greater structural support to the final installation.

This alternative embodiment may be used to surround or encase synthetic ester-based fluid equipment, and allows for rain water to filter through the fabric wall. This alternative embodiment may also be used within drains found on the floors of containment areas and be bound with non-porous liner fabric, which would only allow water to drain through the fabric graphene-filled window, and seal any synthetic ester-based fluid in said fabric window. A further use of this alternative embodiment may include use of the fabric to surround a slotted pipe where the water is discharged into the fabric.

The collective embodiments of the present invention thus allow for the novel absorption of both natural and synthetic ester-based fluids in locations where such fluids are utilized and containment issues are a problem. The present invention is further designed to allow water to flow through while the absorption process is in progress (with regards to the oil/ fluids). In its plug form, the present invention may be extracted once the threat of such fluids releasing into the environment is removed, and the media of the present invention—now containing the fluids in question—may be safely discarded.

Thus, the present invention provides one or more of the following advantages: 1) an absorption media for preventing release of synthetic ester based fluids into the environment while still simultaneously allowing for water flow; 2) an absorption media for preventing release of both natural and synthetic ester based fluids into the environment while still simultaneously allowing for water flow; 3) an absorption media that collects natural and synthetic ester based fluids which can be safely removed from a drain in a containment vessel.

While the present invention has been particularly described, in conjunction with one or more specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of making an adsorption/absorption media comprising:
    providing a graphene or graphite powder;
    forming a final emulsion using said powder by combining said powder with a monomer, an initiator, an emulsifier, and water;
    curing the final emulsion to form a resultant product; and
    drying the resultant product.

2. The method of claim 1 wherein the graphene or graphite powder has a surface area between 300-500 $m^2/g$, MT % 90 (6 μm).

3. The method of claim 1 wherein said monomer consists of aliphatic acrylates.

4. The method of claim 3 wherein said aliphatic acrylates are from the group consisting of: butyl acrylate, 2-ethylhexyl acrylate, dodecyl acrylate, ethyl acrylate, hexyl acrylate, isobutyl acrylate, isopropyl acrylate, nonyl acrylate, sec-butyl acrylate, and methyl acrylate.

5. The method of claim 1 wherein said monomer is from the group consisting of: butyl acrylate, divinyl benzene, methyl acrylate, tetra(ethylene glycol) diacrylate, and butyl methacrylate.

6. The method of claim 1 wherein said initiator is an oil soluble azo initiator.

7. The method of claim 6 wherein said oil soluble azo initiator is from the group consisting of: MEN (2,2'-azobis (2-methylpropionitrile)), 2,2-azobis(2,4-dimethylvaleronitrile), 2,2'-azobis(2-methylbutyronitrile), or dimethyl 2,2'-azobis(2-methylpropionate).

8. The method of claim 1 wherein said emulsifier is a nonionic surfactant.

9. The method of claim 1 wherein said emulsifier is a hydrophobic emulsifier with a hydrophile-lipophile balance value between 3-7.

10. The method of claim 1 wherein said emulsifier is from the group consisting of: sorbitan monooleate, sorbitan stearate, sorbitan monopalmitate, and glyceryl monostearate.

11. A method of making an adsorption/absorption media, comprising:
    forming an organic phase mixture of said adsorption/ absorption media, including:
        adding 4 to 5 Kg of butyl acrylate (>=99% purity) to a first vessel;
        adding 25 to 30 g of divinyl benzene Technical grade (80% purity) to said first vessel;
        adding 9 to 15 g of 2,2' azobisisobutyronitrile to said first vessel;
    mixing said organic phase mixture until its color is approximately clear;
    forming an aqueous phase mixture of said adsorption/ absorption media, including:
        adding 7 to 7.5 Kg of water to a second vessel;
        adding 50 to 55 g of graphene or graphite powder to said second vessel;
    mixing said aqueous phase mixture;

combining said organic phase mixture with said aqueous phase mixture to form a final emulsion;
adding an emulsifier into the final emulsion;
mixing said final emulsion until its color is approximately uniformly black;
pouring said final emulsion into a container and curing said final emulsion at about 140 to 170° F. for about 8 to 15 hours to form a resultant product, and then applying a liquid extractor to remove excess liquid from said resultant product;
drying said resultant product; and
grinding said resultant product into granules about 1 to 15 mm in diameter.

12. The method of claim 11 including coating said granules with a wax.

13. The method of claim 11 further including the step of mixing said granules with polymers, wherein said step of mixing said granules with polymers includes mixing a ratio of five parts granules to two parts polymers.

14. The method of claim 11 wherein said step of curing said final emulsion occurs at about 145° F. for about 12 hours.

15. A process for making an adsorption/absorption media, comprising:
providing a graphene or graphite polymer composite;
forming a final emulsion by mixing said graphene or graphite polymer composite with a predetermined amount of butyl acrylate, divinyl benzene, 2,2' azobisisobutyronitrile, an emulsifier, and water;
thermally initiating polymerization by curing said final emulsion at a temperature between 140 to 170° F. to form a resultant product, and then cooling said resultant product at approximately room temperature;
subjecting said resultant product to compression or rolling or wringing to remove excess liquid;
drying said resultant product; and
grinding said resultant product into smaller portions or granules.

16. The process of claim 15 wherein said emulsifier is from the group consisting of sorbitan monooleate, sorbitan stearate, sorbitan monopalmitate, and glyceryl monostearate.

17. The process of claim 15 wherein the final emulsion is cured at about 140 to 170° F. for about 8-15 hours.

18. The process of claim 15 wherein talc powder is further added to said granulated resultant product.

19. The process of claim 15 wherein said step of thermally initiating polymerization by curing includes curing at approximately 60° C. for 8-16 hours.

20. The process of claim 15 further including the step of mixing said granulated resultant product with additional polymers.

21. The process of claim 20 wherein said step of mixing said granulated resultant product with said additional polymers includes mixing at a ratio of five parts granulated resultant product to two parts additional polymers.

22. An adsorption/absorption media plug structure for the filtration of oils from liquids, comprising:
A granulated adsorption/absorption media comprising:
a graphene and/or graphite powder having a surface area between 300-500 m$^2$/g, MT % 90 (6 μm);
a monomer comprising aliphatic acrylates;
an emulsifier; and
an initiator comprising an oil soluble azo initiator; and
a plug structure having an ingress and an egress, and a plug housing for receiving the granulated adsorption/absorption media therein.

23. The adsorption/absorption media plug of claim 22, wherein the plug structure housing further includes additional polymers mixed with said granulated adsorption/absorption media.

24. The adsorption/absorption media plug of claim 23, wherein the adsorption/absorption media and additional polymers within the housing is mixed at a ratio of approximately five parts granulated adsorption/absorption media to two parts additional polymers.

25. The adsorption/absorption media plug of claim 22, further including a perforated plate disposed within the housing near the egress.

26. The adsorption/absorption media plug of claim 22, wherein said aliphatic acrylates are from the group consisting of: butyl acrylate, 2-ethylhexyl acrylate, dodecyl acrylate, ethyl acrylate, hexyl acrylate, isobutyl acrylate, isopropyl acrylate, nonyl acrylate, sec-butyl acrylate, and methyl acrylate.

27. The adsorption/absorption media plug of claim 22, wherein said oil soluble azo initiator is from the group consisting of: AIBN (2,2'-azobis(2-methylpropionitrile)), 2,2-azobis(2,4-dimethylvaleronitrile), 2,2'-azobis(2-methylbutyronitrile), or dimethyl 2,2'-azobis(2-methylpropionate).

28. The adsorption/absorption media plug of claim 22 wherein said emulsifier being from the group consisting of: sorbitan monooleate, sorbitan stearate, sorbitan monopalmitate, and glyceryl monostearate.

29. The adsorption/absorption media plug of claim 22 wherein said plug structure is designed to allow for a vertical orientation install.

30. The adsorption/absorption media plug of claim 22 wherein said plug structure is designed to allow for an angled orientation install.

31. The adsorption/absorption media plug of claim 30 wherein said angled orientation install at an angle substantially between 15°-35° with respect to a planar floor.

32. An adsorption/absorption media wall structure for the filtration of oils from liquids, comprising:
a granulated adsorption/absorption media comprising:
a graphene or graphite powder having a surface area between 300-500 m$^2$/g, MT % 90 (6 μm);
a monomer comprising aliphatic acrylates;
an emulsifier; and
an initiator comprising an oil soluble azo initiator; and
a fabric encasing said granulated adsorption/absorption media formed as a wall;
wherein said wall is partially buried below a ground or planar surface.

33. The adsorption/absorption media wall structure of claim 32 further including pockets sewn into the fabric of said wall for receiving angled brackets therein.

34. The adsorption/absorption media wall structure of claim 33 wherein said angled brackets are formed in a substantially 90° angle, a first part of the angled brackets being received by said pockets, and a second part of the angled brackets being buried below the ground or planar surface.

35. The adsorption/absorption media plug of claim 32, wherein said aliphatic acrylates are from the group consisting of: butyl acrylate, 2-ethylhexyl acrylate, dodecyl acrylate, ethyl acrylate, hexyl acrylate, isobutyl acrylate, isopropyl acrylate, nonyl acrylate, sec-butyl acrylate, and methyl acrylate.

36. The adsorption/absorption media plug of claim 32, wherein said oil soluble azo initiator is from the group consisting of: AIBN (2,2'-azobis(2-methylpropionitrile)), 2,2-azobis(2,4-dimethylvaleronitrile), 2,2'-azobis(2-methylbutyronitrile), or dimethyl 2,2'-azobis(2-methylpropionate).

37. The adsorption/absorption media plug of claim 32 wherein said emulsifier is from the group consisting of: sorbitan monooleate, sorbitan stearate, sorbitan monopalmitate, and glyceryl monostearate.

\* \* \* \* \*

UNITED STATES PATENT AND TRADEMARK OFFICE
CERTIFICATE OF CORRECTION

PATENT NO. : 11,389,757 B2
APPLICATION NO. : 16/732963
DATED : July 19, 2022
INVENTOR(S) : William J. Gannon and David Tomlinson It is certified that error appears in the above-identified patent and that said Letters Patent is hereby corrected as shown below:

In the Specification

Column 8, Line 37, change "about 1 g" to "about 11g"

In the Claims

Column 12, Line 38, change "MEN" to "AIBN"

Signed and Sealed this
Tenth Day of January, 2023

Katherine Kelly Vidal
*Director of the United States Patent and Trademark Office*